(12) United States Patent
Tatebayashi et al.

(10) Patent No.: US 6,182,215 B1
(45) Date of Patent: Jan. 30, 2001

(54) INFORMATION DEVICES WHICH SELECT AND USE ONE OUT OF PLURALITY OF ENCRYPTION UTILIZATION PROTOCOLS FOR PROTECTING COPYRIGHTS OF DIGITAL PRODUCTIONS

(75) Inventors: Makoto Tatebayashi, Takarazuka; Syunji Harada, Osaka, both of (JP)

(73) Assignee: Matsushita Electric Industrial Co., Ltd., Osaka-fu (JP)

( * ) Notice: Under 35 U.S.C. 154(b), the term of this patent shall be extended for 0 days.

(21) Appl. No.: 09/030,785

(22) Filed: Feb. 25, 1998

(30) Foreign Application Priority Data

Feb. 28, 1997 (JP) .................................................. 9-046529

(51) Int. Cl.⁷ ...................................................... H04L 9/32
(52) U.S. Cl. ............................................. 713/168; 705/57
(58) Field of Search ................................... 713/150, 151, 713/152, 168, 172; 705/80, 57

(56) References Cited

U.S. PATENT DOCUMENTS

| 4,074,079 | * | 2/1978 | Prell et al. ............................. | 713/168 |
| 4,965,766 | * | 10/1990 | Fukushima et al. .................. | 713/150 |
| 5,355,413 | * | 10/1994 | Ohno ..................................... | 713/172 |
| 5,657,390 | * | 8/1997 | Elgamal et al. ...................... | 713/151 |
| 5,784,566 |   | 7/1998 | Gleckler et al. . | |

FOREIGN PATENT DOCUMENTS 0 537 971 A2    4/1993 (EP) .
2671649    1/1993 (JP) .

OTHER PUBLICATIONS

Menezes, Oorschot, Vanstone: "Handbook of Applied Cryptography" Oct. 1, 1996, CRC Press, Boca Raton, Florida, USA, pp. 400–405.

Bloom Ja et al.: "Copy Protection for DVD Video", Proceedings of the IEEE, US IEEE, New York, vol. 87 no. 7, Jul. 1999, pp. 1267–1276.

* cited by examiner

Primary Examiner—Gilberto Barron, Jr.
(74) Attorney, Agent, or Firm—Price & Gess

(57) ABSTRACT

A verifier and a claimant notify each other of verifier type information and claimant type information, respectively. The verifier determines a verifier method corresponding to a combination of the verifier type information and the notified claimant type information, generates challenge data in accordance with the determined verifier method, and transmits the challenge data to the claimant. On receiving the challenge data from the verifier, the claimant determines a claimant method corresponding to the combination of the claimant type information and the notified verifier type information. The claimant then performs claimant processing on the challenge data using the determined claimant method to obtain response data, and transmits the response data to the verifier. On receiving the response data from the claimant, the verifier performs verifier processing on the response data using the determined verifier method.

14 Claims, 8 Drawing Sheets

FIG. 3A

TYPE:1
| PUBLIC_VER. 2.6 |
| PUBLIC_VER. 1.3 |
| SECRET_VER. 2.0 |
| SECRET_VER. 1.3 |
| SECRET_VER. 1.0 |

TYPE:2
| PUBLIC_VER. 1.3 |
| SECRET_VER. 2.0 |
| SECRET_VER. 1.3 |
| SECRET_VER. 1.0 |

TYPE:3
| SECRET_VER. 2.0 |
| SECRET_VER. 1.3 |

TYPE:4
| PUBLIC_VER. 2.6 |
| PUBLIC_VER. 1.3 |
| SECRET_VER. 1.3 |
| SECRET_VER. 2.0 |

TYPE:5
| PUBLIC_VER. 1.3 |
| SECRET_VER. 2.0 |

TYPE:6
| SECRET_VER. 1.3 |

FIG. 3B

| TYPE:1      | TYPE:2      | TYPE:3      |
| VERIFIER 101 | VERIFIER 102 | VERIFIER 103 |
| TYPE:4      | TYPE:5      | TYPE:6      |
| CLAIMANT 104 | CLAIMANT 105 | CLAIMANT 106 |

FIG. 6

SECURITY PRIORITY TABLE

|  | TYPE:1 | TYPE:2 | TYPE:3 |
|---|---|---|---|
| TYPE:4 | PUBLIC_VER. 2.6 | SECRET_VER. 2.0 | SECRET_VER. 2.0 |
| TYPE:5 | PUBLIC_VER. 1.3 | PUBLIC_VER. 1.3 | SECRET_VER. 2.0 |
| TYPE:6 | SECRET_VER. 1.3 | SECRET_VER. 1.3 | SECRET_VER. 1.3 |

FIG. 7

SPEED PRIORITY TABLE

|  | TYPE:1 | TYPE:2 | TYPE:3 |
|---|---|---|---|
| TYPE:4 | SECRET_VER. 2.0 | SECRET_VER. 2.0 | SECRET_VER. 2.0 |
| TYPE:5 | SECRET_VER. 2.0 | SECRET_VER. 2.0 | SECRET_VER. 2.0 |
| TYPE:6 | SECRET_VER. 1.3 | SECRET_VER. 1.3 | SECRET_VER. 1.3 |

INFORMATION DEVICES WHICH SELECT AND USE ONE OUT OF PLURALITY OF ENCRYPTION UTILIZATION PROTOCOLS FOR PROTECTING COPYRIGHTS OF DIGITAL PRODUCTIONS

BACKGROUND OF THE INVENTION

1. Field of the Invention

The present invention relates to a plurality of information devices which are linked by a communication link in an encryption utilization communication system for protecting digital data transmitted on the communication link between the plurality of information devices.

2. Description of the Prior Art

It has become increasingly common that video productions such as movies are digitized and compressed. Such digitized and compressed video productions hardly suffer from picture degradation, so that users can always enjoy video productions with high picture quality. While analog video productions which have been repeatedly dubbed have profound loss in picture quality, digitized video productions which have been repeatedly dubbed have no picture degradation.

In other words, digitized video productions are far more susceptible to copyright infringement acts, such as unauthorized production of dead copies and unauthorized alteration, than analog video productions. When such dead copies or altered video productions are distributed, producers of the original digitized video productions will suffer tremendous damage. Because of this danger, the producers are cautious of having their video productions digitized. Accordingly, the issue concerning the digitization of video productions is whether such productions can be protected against copyright infringements.

It should be noted that dead copies of a video production can be produced by connecting a video reproduction device for reproducing a recording medium on which the video production is recorded and an information recording device for recording the reproduced video production onto a recording medium. On the other hand, unauthorized alteration of a video production can be performed by connecting a video reproduction device for reproducing a recording medium on which the video production is recorded and a video editing device for temporarily storing the reproduced video production onto a hard disc for later editing.

In order to prevent such infringements, video reproduction devices which reproduce video productions must prevent the video productions from being distributed to unauthorized devices, such as information recording devices or digital information copying devices. For this purpose, when a video reproduction device is linked to such a device via a communication link, it is necessary for the video reproduction device to verify the authenticity of the device.

The most representative techniques used for verifying the authenticity of the device in communication are authentication methods. In these methods, a transmitter device verifies the authenticity of a receiver device, and only proceeds to transmit data to receiver devices that have been successfully verified, thereby preventing unauthorized devices from receiving the data. It should be noted here that since the receiver device needs to lay claim to its authenticity, it is generally referred to as the "claimant", while the transmitter device needs to verify the authenticity of the claimant, and so is referred to as the "verifier".

Predetermined standards have been created for use by devices related to the recording and reproduction of optical discs, in order to protect copyrights. Here, the issue is whether a device conforms to the predetermined standard. Accordingly, the "verification of the authenticity" described above is performed by "judging whether a device conforms to the predetermined standard".

An example of a conventional authentication technique is a one-way authentication method using the encryption techniques taught by the ISO/IEC (International Organization for Standardization/International Electrotechnical Commission) 9798-2 Standard. This authentication method is based on the claimant having secret data called a claimant key which it uses to prove its authenticity to the verifier without transmitting the claimant key itself. In this setup, the verifier selects data and transmits this to the claimant. This process is called "challenge", in which the transmitted data (called "challenge data") is set at 64 bits in accordance with the ISO/IEC 9798-2 Standard.

The claimant encrypts the challenge data using an encryption algorithm and the claimant key. Here, the encryption is such that even if an unauthorized third party obtains both the challenge data and the encryption result, it will still be impossible to derive the claimant key from these values. The claimant transmits the encrypted data to the verifier as "response data".

The verifier, which receives the response data, is provided with a decryption algorithm corresponding to the encryption algorithm and a verifier key, which it uses to decrypt the response data. The verifier then compares the decryption result with the challenge data. When these match, the verifier judges that the claimant is in possession of the valid claimant key, and so verifies the authenticity of the claimant. This one-way authentication is completed at the point when one device proves its authenticity to the other device, though one-way authentication processing may be repeated by switching the verifier and the claimant so that each device can verify the authenticity of the other device (this method is called "two-way authentication").

There are two encryption systems used for authentication methods: a secret key encryption system and a public key encryption system. In these encryption systems, a key used for generating response data is referred to as the "claimant key", while a key used for verifying the authenticity of the response data is referred to as the "verifier key".

In the secret key encryption system a same key can be used as the claimant key and the verifier key. Accordingly, both the claimant key and the verifier key must be kept secret when using secret key encryption.

In the public key encryption system, different keys are used as the claimant key and the verifier key. Accordingly, while the claimant key should be kept secret, the verifier key does not have to be kept secret (the key which should be kept secret is referred to as the "secret key", and the key which does not have to be kept secret is referred to as the "public key").

When performing the secret key encryption using computer software, the processing time can be reduced. Also, when performing the secret key encryption using hardware, the apparatus can be realized compactly. On the other hand, there is a drawback with the secret key encryption system in that not only the claimant key but the verifier key should be kept secret. When, for example, the claimant key is changed, it becomes necessary to change the verifier key, too. However, a verifier key corresponding to the new claimant key of the claimant cannot be transmitted to the verifier via the communication link, since data on the communication link is in principle not secure against unauthorized copying and thus its secrecy is not fully protected. Accordingly, there is a difficulty in changing the claimant key of the claimant. Since all devices in the secret key encryption system have the same secret information (regardless of whether it is nominally a claimant key or a verifier key), once this secret information leaks out, the secrecy of the entire system breaks down.

As for the public key encryption system, it is widely known that extensive numerical calculations are required to perform public key encryption. To perform the public key encryption using standard computer software requires great amounts of processing time. Also, in order to perform the public key encryption using specialized hardware, the hardware needs to be of a large-scale. While the public key encryption system has these drawbacks, the system has an advantage in that the verifier key used for verifying the authenticity of the response data does not have to be kept secret but can be made public in an authentication method in challenge-response format. Security of the authentication method using the public key encryption can be maintained even when the verifier key is known. When, for example, the claimant key is changed, a verifier key corresponding to the new claimant key can be transmitted from the claimant to the verifier via the communication link. Thus, the authentication method in challenge-response format using the public key encryption system is more flexible than the authentication method in challenge-response format using the secret key encryption system, as it can change the claimant key without affecting the security of the entire system (due to the reasons described above, authentication methods which use both secret and public keys can be regarded as more secure than authentication methods which use only secret keys).

There is a range of choices concerning authentication methods using the public key encryption system. For example, there is an inverse relation in the authentication methods between security and processing speed (when using computer software) or hardware scale (when using specialized hardware).

Thus, there are an increasing number of verifier methods and claimant methods to choose from, including public key encryption utilization methods and secret key encryption utilization methods. As a result, when developing new products related to the recording and reproduction of video productions, it is possible to implement optimum verifier and claimant methods for the hardware scale and processing speed of the new products.

While it is desirable for producers who intend to develop new products to have a wide variety of verifier and claimant methods to choose from, there is also a danger of authentication failure when certain types of verifiers are connected with certain types of claimants. For instance, when authentication is performed between a verifier which has a verifier method using the public key encryption and a claimant which has a claimant method using the secret key encryption, two devices cannot perform the authentication properly. Also, when the verifier and the claimant both perform authentication using the secret key encryption but with different versions of the software or hardware, each device cannot verify the authenticity of the other device.

In order to avoid such inconsistencies, producers need to develop verifiers and claimants which are capable of executing as large a number of versions of authentication protocols in challenge-response format as possible. For example, a verifier can be provided with hardware for a first verifier method using the public key encryption system and hardware for a second verifier method using the secret key encryption system. When a claimant has only a second claimant method using the secret key encryption system, both devices can perform authentication successfully.

However, when both the verifier and the claimant are capable of executing a plurality of verifier and claimant methods respectively, a less secure verifier/claimant method may be automatically selected by the verifier and the claimant, so that a more secure verifier/claimant method which is possessed by both devices may not be utilized. For instance, when the claimant is provided with a first claimant method using the public key encryption and the second claimant method using the secret key encryption, the verifier and the claimant may choose the less secure second verifier/claimant method using the secret key encryption to perform authentication. As a result, the more secure first verifier/claimant method using the public key encryption may not be utilized.

The above explanation has focused on authentication techniques, although the problems stated above are not limited to such. When there are a plurality of choices of encryption utilization protocols for protecting the copyrights and secrecy of video productions which are to be transmitted between a plurality of devices, the transmitter device and the receiver device may use different versions of an encryption utilization protocol. As a result, the receiver device may fail to decrypt the video productions which have been encrypted by the transmitter device. Also, the transmitter device may use an encryption utilization protocol which the receiver device does not possess to encrypt the video productions and transmits them to the receiver device, which as a result cannot decrypt the encrypted video productions.

Thus, the danger of "non-communicative state", caused by having a plurality of choices of encryption utilization protocols, is not limited to the authentication techniques, but concerns every communication system which has a plurality of choices of encryption utilization protocols.

SUMMARY OF THE INVENTION

It is an object of the present invention to provide a communication system for effectively selecting and using an encryption utilization protocol from a plurality of choices of encryption utilization protocols.

The above object can be fulfilled by a communication system where a plurality of information devices that are capable of executing a plurality of encryption utilization protocols communicate with each other, wherein each information device includes: a notification unit for transmitting type information showing a device type of a present information device, that represents at least one encryption utilization protocol that can be executed by the present information device out of the plurality of encryption utilization protocols, to another information device in the communication system with which communication is to be performed; a determining unit for determining which encryption utilization protocol is to be used in the communication, from a combination of the type information of the present information device and type information received from the other information device with which the communication is to be performed; and a communication unit, equipped with at least one protocol correspondence communication unit that each performs communication using a corresponding encryption utilization protocol out of the encryption utilization protocols that are represented by the device type shown by the type information of the present information device, for having one of the protocol correspondence communication units perform the communication with the other information device using the encryption utilization protocol determined by the determining unit.

With the stated construction, when performing communication, each information device selects the encryption utilization protocol to be used in accordance with the combination of its own type information and the type information of the other information device. As a result, even when information devices have different capabilities of executing encryption utilization protocols because of differences in processing capability and hardware scale, each information device can still perform communication successfully.

For instance, when there is a huge gap in the capabilities of executing encryption utilization protocols between a first information device which can execute a plurality of encryption utilization protocols and a second information device which can execute only one encryption utilization protocol, the determining unit of the first information device determines the encryption utilization protocol which can be executed by the second information device out of the plurality of encryption utilization protocols. Accordingly, regardless of the difference in the capabilities of executing encryption utilization protocols between two information devices, communication can be successfully performed. As a result, the "non-communicative state" caused by the difference in the capabilities of executing encryption utilization protocols can be prevented.

Here, the communication system may include n different device types, n being at least two, wherein the determining unit of each information device includes: a table storage unit for storing at least one table where each combination of two device types selected from the n different device types is associated with protocol correspondence information that shows which of the plurality of encryption utilization protocols should be used for the combination; a type information storage unit for storing the type information showing the device type of the present information device out of the n different device types; and a determination unit for determining, on being informed of the type information of the other information device with which the communication is to be performed, an encryption utilization protocol shown by protocol correspondence information that is associated in the table stored in the table storage unit to the combination of the type information of the other information device and the type information of the present information device as the encryption utilization protocol which is to be used in the communication, and wherein the communication unit has a protocol correspondence communication unit that corresponds to the encryption utilization protocol determined by the determination unit perform the communication using the determined encryption utilization protocol.

With the stated construction, when a first information device and a second information device have capabilities of executing a plurality of encryption utilization protocols, an optimum encryption utilization protocol for the combination of type information of the first and second information devices, out of the plurality of encryption utilization protocols, is shown in a table. Accordingly, the first and second information devices can use the optimum encryption utilization protocol shown in the table to perform communication. As a result, an optimum encryption utilization protocol for a combination of any two information devices can be used with reference to the table.

Here, the plurality of encryption utilization protocols may be a plurality of authentication protocols, wherein each protocol correspondence communication unit in one of the plurality of information devices in the communication system includes: an authentication unit for having another information device in the communication system with which communication is to be performed make an attempt to prove that the other information device is authentic using an authentication protocol determined by the determination unit, and for judging from the attempt whether the other information device is authentic; and a transmission unit for transmitting data that is subject to protection to the other information device only when the authentication unit has judged that the other information device is authentic.

With the stated construction, when a first information device is a transmitter of data, such as digitized video productions, which should be protected against unauthorized acts by unauthorized devices, and when the first information device needs to verify the authenticity of a second information device, the first information device proceeds to transmit the data only after verifying the authenticity of the second information device. As a result, unauthorized acts such as copyright infringements can be prevented.

Here, the table storage unit in each information device may store a plurality of different tables in which each combination of two device types selected from the n different device types is associated with protocol correspondence information that shows which of the plurality of authentication protocols should be used for the combination, wherein a first table out of the plurality of different tables stores protocol correspondence information that shows a most secure authentication protocol that should be used for each combination of two device types selected from the n different device types, wherein a second table out of the plurality of different tables stores protocol correspondence information that shows an authentication protocol with a highest processing speed that should be used for each combination of two device types selected from the n different device types, wherein the determining unit in the information device further includes a selection unit for selecting one out of the plurality of different tables stored in the table storage unit with consideration to which of high security and fast processing is desired for the communication to be performed and for informing the other information device of the selected table, and wherein the determination unit in each information device determines the authentication protocol to be used in the communication from the table selected by the selection unit out of the plurality of different tables stored in the table storage unit.

With the stated construction, when a first information device and a second information device are capable of executing a plurality of authentication protocols, a most secure authentication protocol and an authentication protocol with a highest processing speed, out of the plurality of authentication protocols, are shown in the tables corresponding to the combination of the type information of the first and second information devices. Accordingly, the first and second information devices can use either the most secure authentication protocol or the authentication protocol with the highest processing speed to perform communication. As a result, an optimum authentication protocol for a combination of any two information devices can be used with reference to the tables.

Here, the plurality of authentication protocols may include a plurality of authentication protocols in challenge-response format, wherein the plurality of authentication protocols in challenge-response format include authentication protocols in challenge-response format that use public key encryption and authentication protocols in challenge-response format that use secret key encryption, wherein the protocol correspondence information in the first table shows the authentication protocols in challenge-response format that use the public key encryption as most secure authentication protocols in challenge-response format, wherein the protocol correspondence information in the second table shows the authentication protocols in challenge-response format that use the secret key encryption as authentication protocols in challenge-response format with the highest processing speed, and wherein the communication unit in each information device is equipped with protocol correspondence communication units which perform communication based on the authentication protocols in challenge-response format that use the public key encryption and protocol correspondence communication units which perform communication based on the authentication protocols in challenge-response format that use the secret key encryption.

With the stated construction, for all information devices which are equipped with large-scale hardware or software for executing the authentication protocols in challenge-response format using the public key encryption, the capability of executing the authentication protocols in challenge-response format that use the public key encryption is shown in the tables. As a result, when both a first information device and a second information device can execute the authentication protocols in challenge-response format that use the public key encryption, utilization of the hardware or software for executing the authentication protocols in challenge-response format that use the public key encryption can be maximized.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3A shows the type codes present in the authentication system shown in FIG. 2;

FIG. 3B shows which of the type codes shown in FIG. 3A are possessed by the verifiers 101–103 and claimants 104–106 shown in FIG. 2;

FIG. 6 shows an example of a security priority table stored in the verifier/claimant method table storage unit 13;

FIG. 7 shows an example of a speed priority table stored in the verifier/claimant method table storage unit 13;

DESCRIPTION OF THE PREFERRED EMBODIMENT

The following is an explanation of an authentication system of the embodiment of the present invention. This authentication system includes two information devices: a verifier and a claimant. In this authentication system, a reception device for receiving video productions transmitted via digital satellite broadcasting is used as an example of the verifier. A video disc recorder for recording the video productions onto a video recording DVD-RAM (Digital Versatile Disc—Random Access Memory) optical disc is used as an example of the claimant. An AV bus, that conforms to predetermined bus standards and is capable of high-speed transmission of stream data specified in MPEG (Moving Picture Expert Group) Standard, is used as an example of a communication link which links the verifier and the claimant. A personal computer which has video editing functions is used as an example of an unauthorized device.

Figure 1:
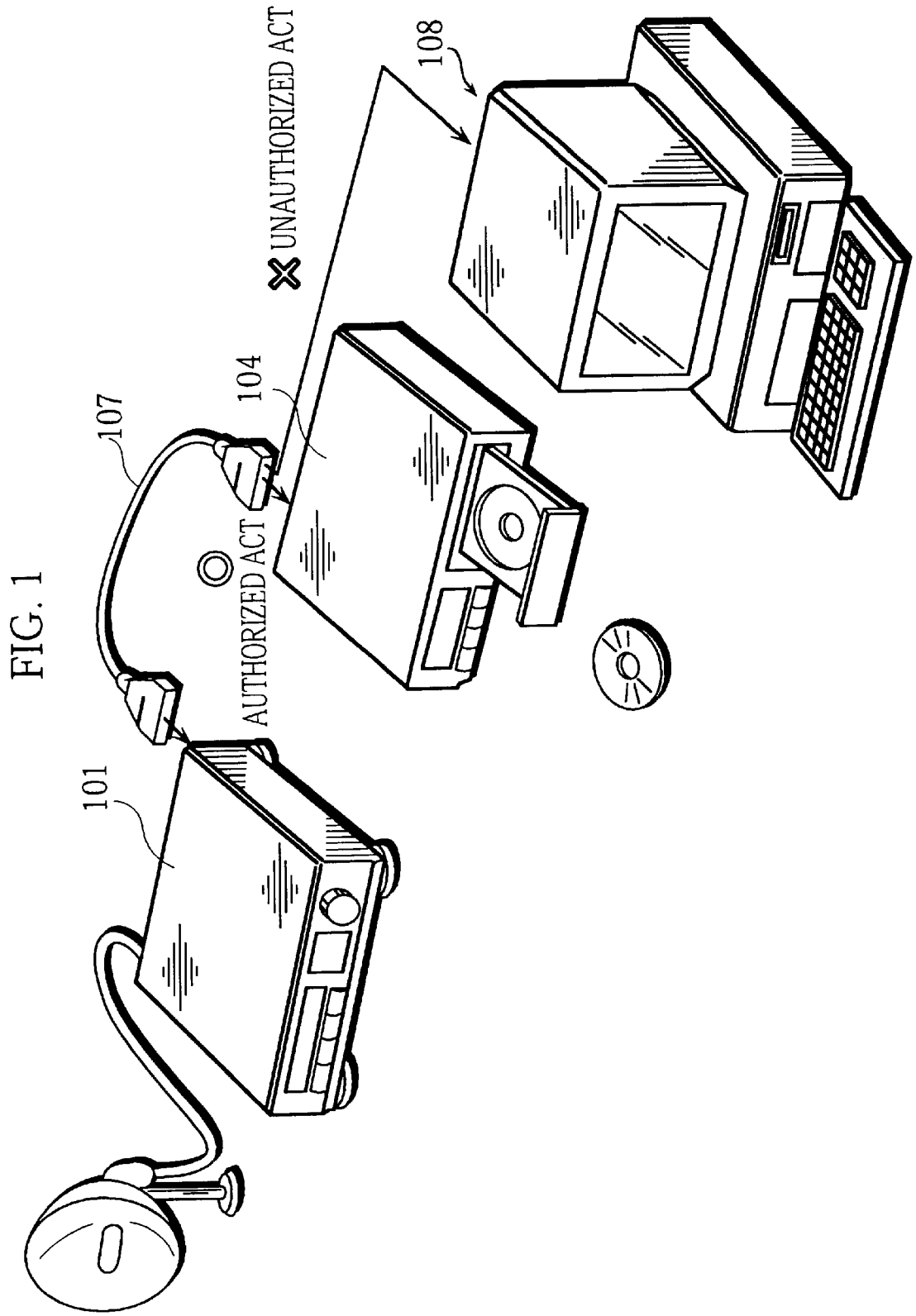
FIG. 1 shows the connection between a verifier and a claimant.

FIG. 1 shows the connection between the verifier and the claimant in the authentication system.

It is authorized to link a verifier 101 and a claimant 104 via an AV bus 107, while to link the verifier 101 and a personal computer 108 is an act which may lead to a copyright infringement (hereinafter, "unauthorized act"). Since video editing software has been installed in the personal computer 108, once a video production transmitted via the digital satellite broadcasting is distributed to the personal computer 108, the video editing software of the personal computer 108 may be used to perform unauthorized alteration of the video production.

Figure 2:
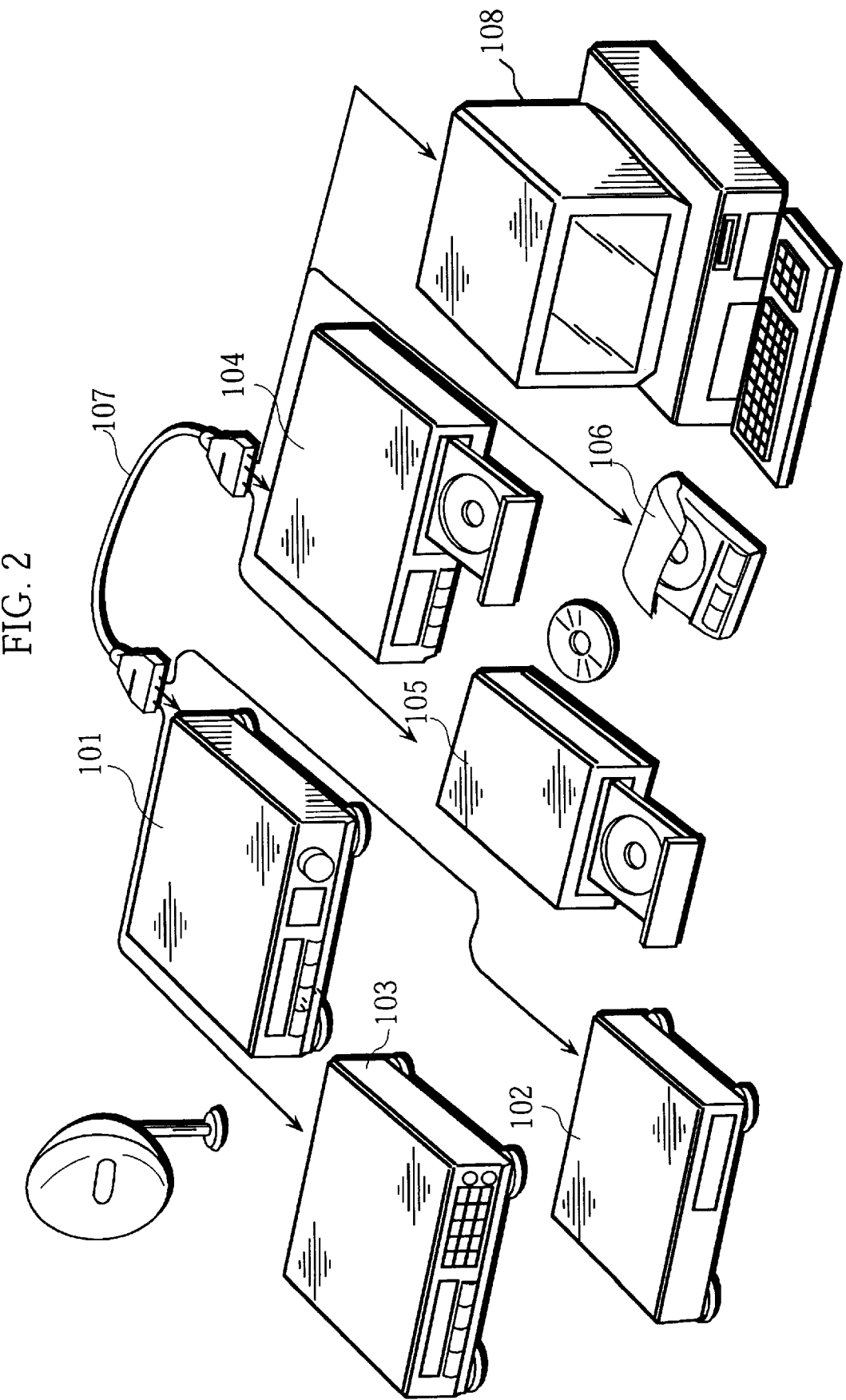
FIG. 2 shows how a plurality of verifiers can be freely connected to a plurality of claimants.

FIG. 2 shows how a plurality of verifiers can be freely connected to a plurality of claimants.

It is authorized to link any of verifiers 101–103 and any of claimants 104–106 via the AV bus 107, while it is unauthorized to link any of the verifiers 101–103 and the personal computer 108. In order to prevent the video production from being distributed to the personal computer 108, the verifiers 101-103 verifies the authenticity of the device to which they are connected via the AV bus 107.

The verifier 101 is a host reception device developed by a producer A, and is provided with the public key encryption utilization algorithms Public_ver. 2.6 and Public_ver. 1.3, and the secret key encryption utilization algorithms Secret_ver. 2.0, Secret_ver. 1.3, and Secret_ver. 1.0. Thus, the verifier 101 is capable of verifying the authenticity of various types of video recording devices. Among these algorithms, the public key encryption utilization algorithm Public_ver. 2.6 is the most secure, though it requires elaborate hardware.

The verifier 102 is a standard reception device developed by the producer A, and is provided with the public key encryption utilization algorithm Public_ver. 1.3 and the secret key encryption utilization algorithms Secret_ver. 2.0, Secret_ver. 1.3, and Secret_ver. 1.0, though it does not possess the most secure public key encryption utilization algorithm Public_ver. 2.6.

The verifier 103 is a low-cost reception device developed by the producer A. To simplify its hardware, it only has reduced compatibility with claimants. The verifier 103 is provided with the secret key encryption utilization algorithms Secret_ver. 2.0 and Secret_ver. 1.3, and it does not have the public key encryption utilization algorithms which are more secure.

The claimant 104 is a host video recording device developed by the producer A, and is provided with the public key encryption utilization algorithms Public_ver. 2.6 and Public_ver. 1.3, and the secret key encryption utilization algorithms Secret_ver. 2.0 and Secret_ver. 1.3. Thus, the claimant 104 is capable of proving its authenticity to various types of reception devices.

The claimant 105 is a standard video recording device developed by the producer A, and is provided with the public key encryption utilization algorithm Public_ver. 1.3 and the secret key encryption utilization algorithm Secret_ver. 2.0, though it does not possess the most secure public key encryption utilization algorithm Public_ver. 2.6. Thus, the claimant 105 does not have a wide range of choices of authentication protocols.

The claimant 106 is a portable video recording device developed by the producer A. To simplify its hardware, it is only provided with the secret key encryption utilization algorithm Secret_ver. 1.3, so that the claimant 106 has very poor compatibility with verifiers.

As described above, there are differences in the capability of executing authentication protocols in challenge-response format among the verifiers 101–103 and the claimants 104–106 shown in FIG. 2. Each of these devices is assigned a type code which shows the executable types of encryption utilization authentication protocols in challenge-response format.

FIG. 3A shows the type codes present in the authentication system in FIG. 2.

In FIG. 3A, there are three device types in the authentication system: a type provided with the public key encryption utilization algorithms Public_ver. 2.6 and Public_ver. 1.3, and the secret key encryption utilization algorithms Secret_ver. 2.0, Secret_ver. 1.3, and Secret_ver. 1.0 (Type 1); a type provided with the public key encryption utilization algorithm Public_ver. 1.3 and the secret key encryption utilization algorithms Secret_ver. 2.0, Secret_ver. 1.3, and Secret_ver. 1.0 (Type 2); and a type provided with the secret key encryption utilization algorithms Secret_ver. 2.0 and Secret_ver. 1.3 (Type 3).

FIG. 3B shows which type code out of the type codes shown in FIG. 3A is attached to the verifiers 101-103 and claimants 104–106 shown in FIG. 2.

The following is an explanation of the processing of the public key encryption utilization algorithms and the secret key encryption utilization algorithms with reference to FIGS. 4A to 14C.

Figure 4A:
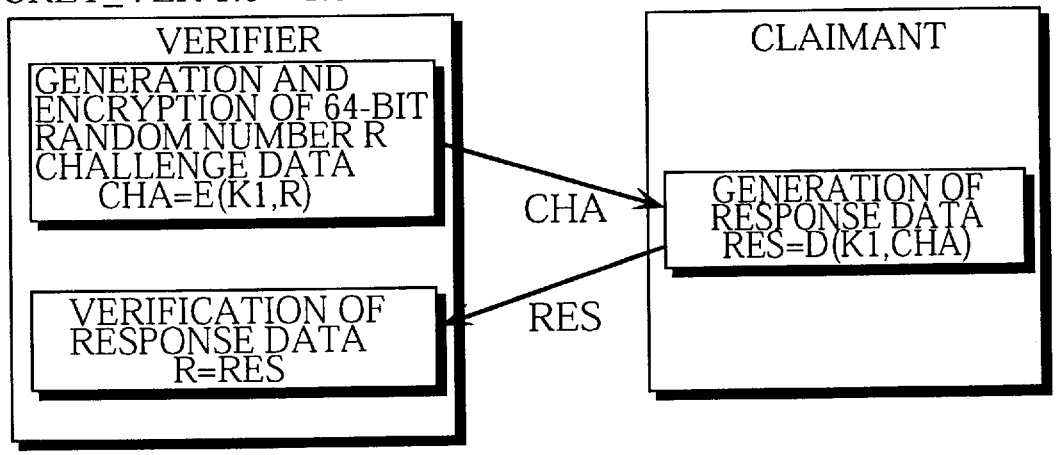
FIGS. 4A, 4B, and 4C show the processing of these public key encryption utilization algorithms and secret key encryption utilization algorithms.

FIG. 4A shows the processing of the secret key encryption utilization algorithms Secret_ver. 1.3 and Secret_ver. 1.0.

In Secret_ver. 1.0 and 1.3, the verifier generates a 64-bit random number R and encrypts this using a secret verifier key K1, before transmitting the encryption result E(K1, R) to the claimant as challenge data CHA. On receiving the challenge data CHA, the claimant decrypts it using a secret claimant key K1, and transmits the decryption result D(K1, CHA) to the verifier as response data RES. On receiving the response data RES, the verifier compares it with the random number R. When these match, the verifier judges that the claimant is in possession of the valid claimant key and so verifies the authenticity of the claimant.

Figure 4B:
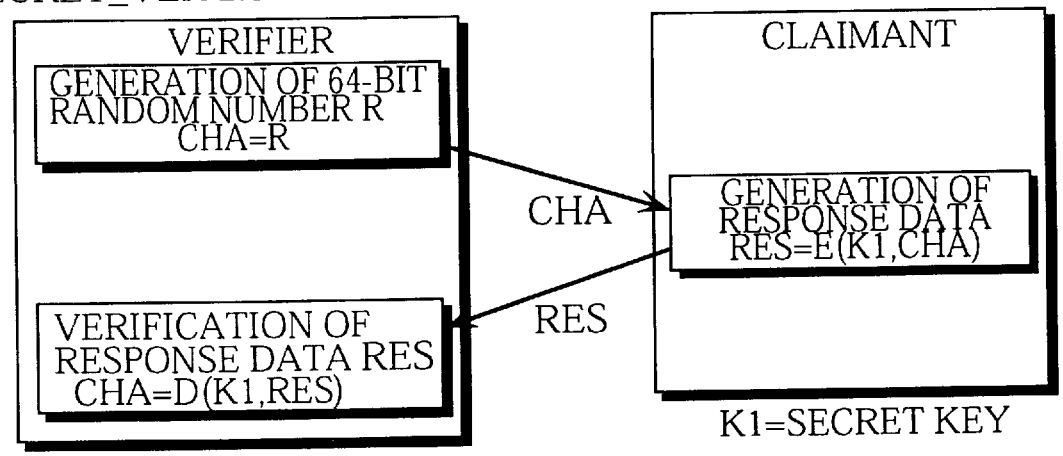

FIG. 4B shows the processing of the secret key encryption utilization algorithm Secret_ver. 2.0.

In Secret_ver. 2.0, the verifier generates a 64-bit random number R and transmits this to the claimant as challenge data CHA. On receiving the challenge data CHA, the claimant encrypts it using a secret claimant key K1, and transmits the encryption result E(K1, CHA) to the verifier as response data RES. On receiving the response data RES, the verifier decrypts it using a secret verifier key K1, and compares the decryption result D(K1, RES) with the challenge data CHA. When these match, the verifier judges that the claimant is in possession of the valid claimant key and so verifies the authenticity of the claimant.

Figure 4C:
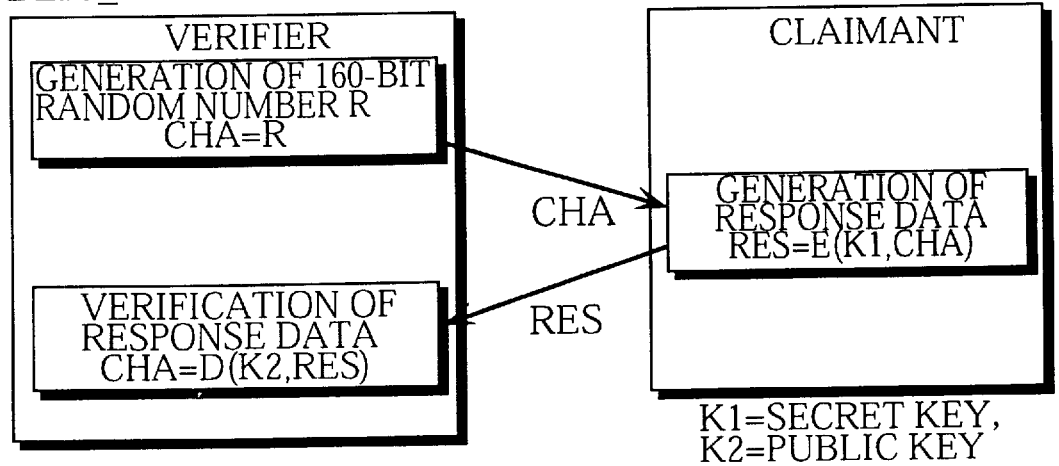

FIG. 4C shows the processing of the public key encryption utilization algorithms Public_ver. 1.3 and Public_ver. 2.6.

In Public_ver. 1.3 and 2.6, the verifier generates a 160-bit random number R and transmits this to the claimant as challenge data CHA. On receiving the challenge data CHA, the claimant encrypts it using a secret claimant key K1, and transmits the encryption result E(K1, CHA) to the verifier as response data RES. On receiving the response data RES, the verifier decrypts it using a public verifier key K2, and compares the decryption result D(K2, RES) with the challenge data CHA. When these match, the verifier judges that the claimant is in possession of the valid claimant key and so verifies the authenticity of the claimant.

Figure 5:
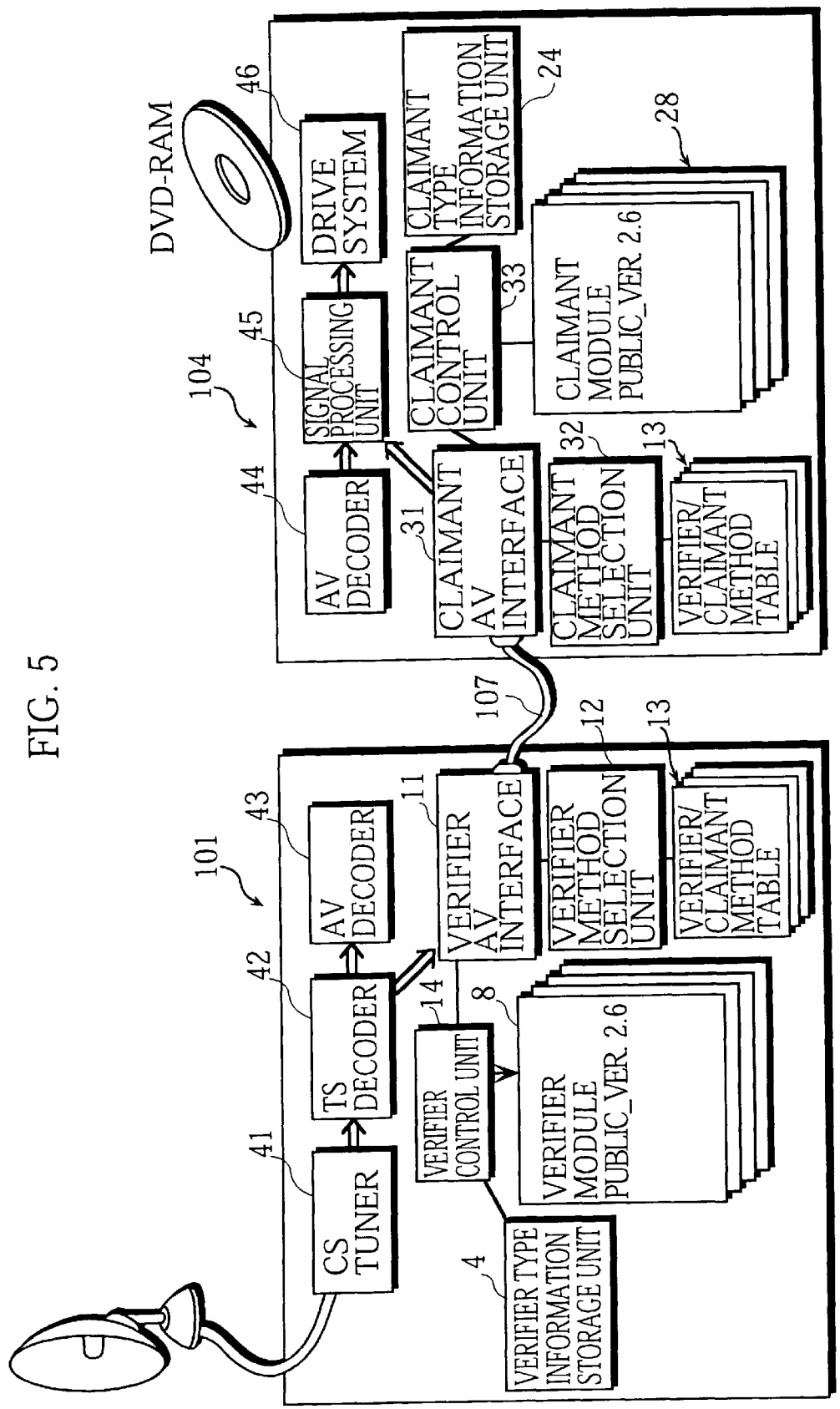
FIG. 5 shows the configuration of the device authentication system of the present embodiment.

FIG. 5 shows the configurations of the verifier 101 and the claimant 104. First, the configuration of the verifier 101 is explained below with reference to the figure.

Verifier 101

As shown in FIG. 5, the verifier 101 includes a verifier type information storage unit 4, a group of verifier modules 8, a verifier AV interface 11, a verifier method selection unit 12, a verifier/claimant method table storage unit 13, a verifier control unit 14, a CS tuner 41, a TS decoder 42, and an AV decoder 43.

The verifier type information storage unit 4 is nonvolatile memory which stores a type code. The verifier 101, provided with the public key encryption utilization algorithms Public_ver. 2.6 and Public_ver. 1.3, and the secret key encryption utilization algorithms Secret_ver. 2.0, Secret_ver. 1.3 and Secret_ver. 1.0, belongs to Type 1 as shown in FIGS. 3A and 3B. Accordingly, Type 1 is stored in the verifier type information storage unit 4 of the verifier 101.

The group of verifier modules 8 is composed of the executable verifier modules for the verifier 101, including Public_ver. 2.6, Public_ver. 1.3, Secret_ver. 2.0, Secret_ver. 1.3, and Secret_ver. 1.0 shown in FIG. 3A.

The verifier modules Public_ver. 2.6 and Public_ver. 1.3 are each composed of flash memory which stores a public verifier key K2 and hardware which includes logic gates for executing the public key encryption utilization algorithm. It should be noted that the public verifier key K2 of each of the verifier modules Public_ver. 2.6 and Public_ver. 1.3 is changeable, since it is stored in the flash memory.

The verifier modules Secret_ver. 2.0, Secret_ver. 1.3, and Secret_ver. 1.0 are each composed of nonvolatile memory which stores a secret verifier key K1 and hardware which includes logic gates for executing the secret key encryption utilization algorithm.

The verifier/claimant method table storage unit 13 stores a plurality of tables which show executable authentication protocols in challenge-response format corresponding to various combinations of verifier type information and claimant type information. The plurality of tables include tables such as a security priority table and a speed priority table.

FIG. 6 shows an example of the security priority table stored in the verifier/claimant method table storage unit 13. According to the figure, the public key encryption utilization algorithm Public_ver. 2.6 is associated with the combination of the verifier Type 1 and the claimant Type 4, while the public key encryption utilization algorithm Public_ver. 1.3 is associated with the combination of the verifier Type 1 and the claimant Type 5. As mentioned above, the verifier 101 is in possession of authentication algorithms for a plurality of authentication protocols in challenge-response format. The security priority table shows the authentication algorithm for the most secure authentication protocol out of the plurality of authentication protocols in challenge-response format.

FIG. 7 shows an example of the speed priority table stored in the verifier/claimant method table storage unit 13. According to the figure, the secret key encryption utilization algorithm Secret_ver. 2.0 is associated with the combination of the verifier Type 1 and the claimant Type 4, while the secret key encryption utilization algorithm Secret_ver. 2.0 is also associated with the combination of verifier Type 1 and claimant Type 5. Thus, the speed priority table shows the authentication algorithm for the authentication protocol of the highest processing speed, out of the plurality of authentication protocols in challenge-response format.

The verifiers 102–103 and the claimants 104–106 are each equipped with the same verifier/claimant method table storage unit 13 as the verifier 101 (as shown by the verifier/claimant method table storage unit 13 in the claimant 104). Common serial numbers are given to the plurality of tables in each verifier/claimant method table storage unit 13 of the verifiers 101–103 and claimants 104–106, so that on starting authentication processing, the verifier and the claimant can notify each other of the number of a table to be used.

It should be noted that in the present embodiment, whether a device is capable of executing one version of an authentication protocol in challenge-response format depends on whether the device is provided with an authentication module for that protocol version. However, when an authentication module for a particular version of an authentication protocol in challenge-response format is compatible with other versions of the same authentication protocol, all executable versions of the authentication protocol in each authentication module should be taken into account in making the tables in the verifier/claimant method table storage unit 13.

When the verifier AV interface 11 receives type information of the claimant 104 via the AV bus 107, the verifier method selection unit 12 refers to the combination of the received claimant type information and the verifier type information stored in the verifier type information storage unit 4 to select one verifier algorithm in a table of the specified number among the plurality of tables stored in the verifier/claimant method table storage unit 13. When there is a verifier algorithm corresponding to the combination of the verifier type and the claimant type, the verifier method selection unit 12 retrieves the name of that verifier algorithm, and activates a verifier module corresponding to the retrieved verifier algorithm, out of the plurality of verifier modules in the group of verifier modules 8 to define the protocol correspondence communication units.

When the verifier 101 receives claimant type information of Type 4, the verifier method selection unit 12 selects the public key encryption utilization algorithm Public_ver. 2.6 according to the combination of Type 1 (type of the verifier 101) and Type 4 from the security priority table as the optimum verifier algorithm.

On the other hand, when the verifier 101 receives claimant type information of Type 5, the verifier method selection unit 12 selects the public key encryption utilization algorithm Public_ver. 1.3 according to the combination of Type 1 and Type 5 from the security priority table as the optimum verifier algorithm.

The CS tuner 41 demodulates carrier waves which have been transmitted to a CS antenna from a digital satellite broadcast station, obtains transport packets specified in MPEG Stream Standard, and outputs them to the TS decoder 42.

The TS decoder 42 converts the transport packets output from the CS tuner 41 into elementary streams specified in the MPEG Standard.

The AV decoder 43 decodes the elementary streams output from the TS decoder 42 into AV signals.

The verifier AV interface 11 transmits the MPEG streams output from the TS decoder 42 to the claimant 104 via the AV bus 107, only when the verifier 101 has verified the authenticity of the claimant 104 using one of the verifier modules in the group of verifier modules 8. When the verifier 101 cannot verify the authenticity of the claimant 104, the MPEG streams output from the TS decoder 42 are not transmitted to the claimant 104 via the AV bus 107.

Claimant 104

The following is an explanation of the configuration of the claimant 104. The claimant 104 includes a claimant type information storage unit 24, a group of claimant modules 28, a verifier/claimant method table storage unit 13, a claimant AV interface 31, a claimant method selection unit 32, a claimant control unit 33, an AV decoder 44, a signal processing unit 45, and a drive system 46.

The claimant type information storage unit 24 stores claimant type information for the claimant 104 showing the capability of executing authentication protocols in challenge-response format. According to FIGS. 3A and 3B, there are three device types in the authentication system in addition to Types 1 to 3 mentioned above: a type, such as the claimant 104, provided with the public key encryption utilization algorithms Public_ver. 2.6 and Public_ver. 1.3, and the secret key encryption utilization algorithms Secret_ver. 2.0 and Secret_ver. 1.3 (Type 4); a type, such as the claimant 105, provided with the public key encryption utilization algorithm Public_ver. 1.3 and the secret key encryption utilization algorithm Secret_ver. 2.0 (Type 5); and a type, such as the claimant 106, provided with the secret key encryption utilization algorithm Secret_ver. 1.3 (Type 6). As the claimant 104 belongs to Type 4, the claimant type information storage unit 24 in the claimant 104 stores Type 4.

The group of claimant modules 28 is composed of the executable claimant modules for the claimant 104, including Public_ver. 2.6, Public_ver. 1.3, Secret_ver. 2.0, and Secret_ver. 1.3, as shown in FIG. 3A. The claimant modules Public_ver. 2.6 and Public_ver. 1.3 are each composed of a memory unit which stores a secret claimant key K1 and hardware which includes logic gates for executing the public key encryption utilization algorithm. The claimant modules Secret_ver. 2.0 and Secret_ver. 1.3 are each composed of a memory unit which stores a secret claimant key K1 and hardware which includes logic gates for executing the secret key encryption utilization algorithm.

The claimant method selection unit 32 refers to the combination of the verifier type information received from the verifier via the AV bus 107 and the claimant type information stored in the claimant type information storage unit 24 to select one claimant algorithm shown in a table stored in the verifier/claimant method table storage unit 13. Then a claimant module in the group of claimant modules 28 corresponding to the selected claimant algorithm is activated.

When the claimant 104 receives verifier type information of Type 1, the claimant method selection unit 32 selects the public key encryption utilization algorithm Public_ver. 2.6 according to the combination of Type 4 (type of the claimant 104) and Type 1 from the security priority table as the optimum claimant algorithm.

On the other hand, when the claimant 104 receives verifier type information of Type 2, the claimant method selection unit 32 selects the secret key encryption utilization algorithm Secret_ver. 2.0 according to the combination of Type 4 and Type 2 from the security priority table as an optimum claimant algorithm.

When the claimant 104 succeeds in proving its authenticity to the verifier 101 using the claimant module selected from the group of claimant modules 28, the claimant AV interface 31 receives the MPEG streams transmitted from the verifier 101 via the AV bus 107 and sends them to the signal processing unit 45.

The AV decoder 44 performs predetermined processing to convert input video and audio signals into MPEG streams, and sends the MPEG streams to the signal processing unit 45.

The signal processing unit 45 performs processing such as amplification, wave-shaping, binarization, demodulation, and error correction on the MPEG streams sent from the AV decoder 44 or from the claimant AV interface 31, and outputs the processed signals to the drive system 46.

The drive system 46 is equipped with a tray for a DVD-RAM and an optical pickup, and records the MPEG streams output from the signal processing unit 45 onto the DVD-RAM by increasing in strength of a light beam to change land phases on the surface of the information layer inside the DVD-RAM.

Figure 8:
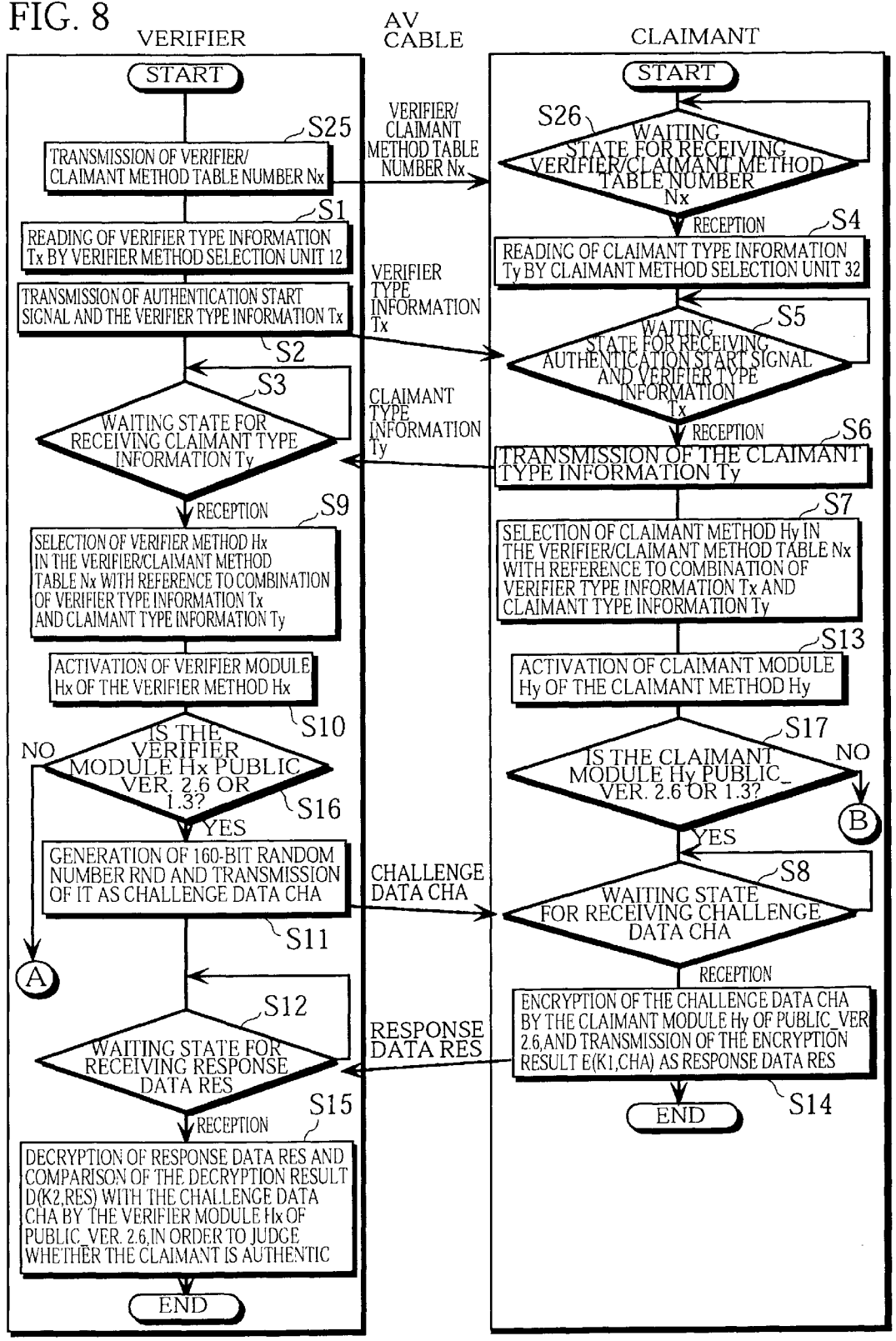
FIG. 8 is a flowchart showing the processing of control programs performed by the verifier control unit 14 and the claimant control unit 33.
Figure 9:
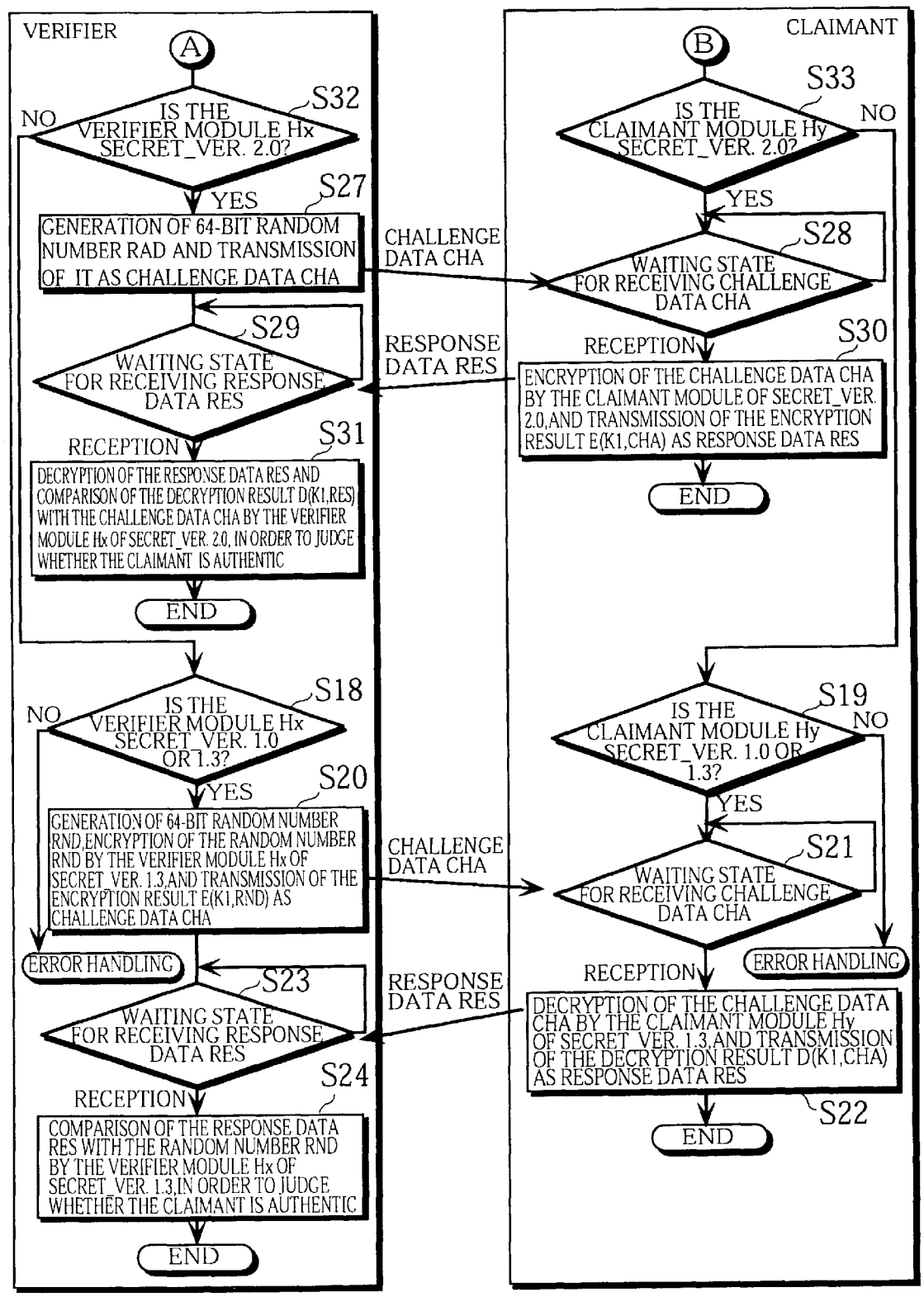
FIG. 9 is a flowchart showing the processing of the control programs performed by the verifier control unit 14 and the claimant control unit 33.

The verifier control unit 14 and the claimant control unit 33 are each composed of a CPU (Central Processing Unit) and a control program for executing authentication protocols in challenge-response format between the verifier 101 and the claimant 104. FIGS. 8 and 9 are flowcharts showing the processing of the control programs in the verifier control unit 14 and the claimant control unit 33. The figures also show communication sequences between the verifier AV interface 11 and the claimant AV interface 31.

After the verifier 101 is activated, the verifier control unit 14 transmits a verifier/claimant method table number Nx to the claimant 104 (Step S25). Here, the verifier/claimant method table number Nx indicates the security priority table among the plurality of tables stored in the verifier/claimant method table storage unit 13.

After transmitting the verifier/claimant method table number Nx to the claimant 104, the verifier control unit 14 has the verifier method selection unit 12 read verifier type information Tx from the verifier type information storage unit 4 (Step S1), and has the verifier AV interface 11 transmit an authentication start signal and the verifier type information Tx to the claimant 104 via the AV bus 107 (Step S2). Accordingly, the verifier type information Type 1 stored in the verifier type information storage unit 4 is transmitted. After the verifier AV interface 11 transmits the verifier type information Tx, the verifier control unit 14 is set into a waiting state for receiving claimant type information Ty (Step S3).

After the claimant 104 is activated, the claimant control unit 33 is set into a waiting state for receiving the verifier/claimant method table number Nx (Step S26). On receiving the verifier/claimant method table number Nx, the 20 claimant control unit 33 has the claimant method selection unit 32 read the claimant type information Ty from the claimant type information storage unit 24 (Step S4). The claimant control unit 33 is then set into a waiting state for receiving the authentication start signal and the verifier type information Tx from the verifier 101 (Step S5). On receiving the verifier type information Tx from the verifier AV interface 11, the claimant control unit 33 has the claimant AV interface 31 transmit the claimant type information Ty to the verifier 101 via the AV bus 107 (Step S6). As a result, the claimant type information Type 4 stored in the claimant type information storage unit 24 is transmitted to the verifier 101 via the claimant AV interface 31 and the AV bus 107.

On transmitting the claimant type information Ty, the claimant control unit 33 has the claimant method selection unit 32 select a claimant method Hy corresponding to the combination of the received verifier type information Tx and the claimant type information Ty in the security priority table indicated by the verifier/claimant method table number Nx (Step S7), and activates a claimant module Hy corresponding to the claimant method Hy (Step S13). When the activated claimant module Hy is either the public key encryption utilization algorithm Public_ver. 2.6 or Public_ver. 1.3, the claimant control unit 33 chooses "Yes" in Step S17, and proceeds to a waiting state for receiving challenge data CHA (Step S8).

After the verifier AV interface 11 receives the claimant type information Ty from the claimant AV interface 31, the verifier control unit 14 has the verifier AV interface 11 send the claimant type information Ty to the verifier method selection unit 12, and proceeds to Step S9. The verifier control unit 14 has the verifier method selection unit 12 select a verifier method Hx corresponding to the combination of the verifier type information Tx and the received claimant type information Ty in the security priority table indicated by the verifier/claimant method table number Nx (Step S9). Since the verifier 101 and the claimant 104 are Type 1 and Type 4 respectively, the public key encryption utilization algorithm Public_ver. 2.6 is selected by the verifier method selection unit 12. After the public key encryption utilization algorithm Public_ver. 2.6 is selected, the verifier control unit 14 activates a verifier module Hx corresponding to the public key encryption utilization algorithm Public_ver. 2.6 (Step S10).

On activating the verifier module Hx of the public key encryption utilization algorithm Public_ver. 2.6, the verifier control unit 14 chooses "Yes" in Step S16, and proceeds to Step S11. The verifier control unit 14 generates a 160-bit random number RND, and transmits this to the claimant 104 via the verifier AV interface 11 as the challenge data CHA (Step S11). The verifier control unit 14 is then set into a waiting state for receiving response data RES (Step S12).

After the claimant AV interface 31 receives the challenge data CHA, the claimant control unit 33 proceeds from Step S8 to Step S14. The claimant control unit 33 has the claimant module Hy of the public key encryption utilization algorithm Public_ver. 2.6 encrypt the challenge data CHA using a secret claimant key K1 to obtain the encrypted data E(K1, CHA), which is then transmitted to the verifier 101 via the claimant AV interface 31 as the response data RES (Step S14).

After the verifier AV interface 11 receives the response data RES from the claimant 104, the verifier control unit 14 proceeds to Step S15. The verifier control unit 14 has the verifier module Hx of the public key encryption utilization algorithm Public_ver. 2.6 decrypt the response data RES using a public verifier key K2 and compare the decryption result D(K2, RES) with the challenge data CHA in order to judge whether the claimant 104 is an authentic device (Step S15). When the comparison results in a match, the verifier 101 verifies the authenticity of the claimant 104. On the other hand, when the comparison does not result in a match, the verifier 101 judges that the claimant 104 is not authentic.

The authentication protocol in challenge-response format explained above has been performed with reference to the security priority table, in which the public key encryption utilization algorithm Public_ver. 2.6 was used. The following is an explanation of an authentication protocol in challenge-response format which is performed using the speed priority table. In the speed priority table, the secret key encryption utilization algorithm Secret_ver. 2.0 is associated with the combination of Type 1 and Type 4. Accordingly, a verifier module Hx of the secret key encryption utilization algorithm Secret_ver. 2.0 and a claimant module Hy of the secret key encryption utilization algorithm Secret_ver. 2.0 are activated in Step S10 of the verifier 101 and Step S13 of the claimant 104, respectively.

When the claimant module Hy of the secret key encryption algorithm Secret_ver. 2.0 is activated (Step S13), the claimant control unit 33 chooses "No" in Step S17, and proceeds to Step S33. The claimant control unit 33 chooses "Yes" in Step S33, and is set into a waiting state for receiving challenge data CHA (Step S28).

When the verifier module Hx of the secret key encryption utilization algorithm Secret_ver. 2.0 is activated (Step S10), the verifier control unit 14 chooses "No" in Step S16, and chooses "Yes" in Step S32 to proceed to Step S27. The verifier control unit 14 generates a 64-bit random number RND and transmits this to the claimant 104 via the verifier AV interface 11 as the challenge data CHA (Step S27). The verifier control unit 14 is then set into a waiting state for receiving response data RES (Step S29).

After the challenge data CHA is received by the claimant AV interface 31, the claimant control unit 33 proceeds from Step S28 to Step S30. The claimant control unit 33 has the claimant module Hy of the secret key encryption utilization algorithm Secret_ver. 2.0 encrypt the challenge data CHA using a secret claimant key K1 to obtain the encrypted data E(K1, CHA), which is then transmitted to the verifier 101 via the claimant AV interface 31 as the response data RES (Step S30).

After the response data RES is received by the verifier AV interface 11, the verifier control unit 14 proceeds to Step S31. The verifier control unit 14 has the verifier module Hx of the secret key encryption utilization algorithm Secret_ver. 2.0 decrypt the response data RES using a secret verifier key K1, and compare the decrypted data D(K1, RES) with the challenge data CHA in order to judge whether the claimant 104 is an authentic device (Step S31).

The authentication protocol in challenge-response format explained above has been performed with reference to the speed priority table, in which the secret key encryption algorithm Secret_ver. 2.0 was used. Lastly, a case in which the secret key encryption utilization algorithm Secret_ver. 1.3 is selected as an authentication protocol in challenge-response format is explained below.

When the secret key encryption utilization algorithm Secret_ver. 1.3 is associated with the combination of Type 1 and Type 4 in a table stored in the verifier/claimant method table storage unit 13, a verifier module Hx of the secret key encryption utilization algorithm Secret_ver. 1.3 and a claimant module Hy of the secret key encryption utilization algorithm Secret_ver. 1.3 are activated in Steps S10 and S13, respectively.

When the claimant module Hy of the secret key encryption utilization algorithm Secret_ver. 1.3 is activated (Step S13), the claimant control unit 33 chooses "No" in Steps S17 and S33, before choosing "Yes" in Step S19. The claimant control unit 33 is then set into a waiting state for receiving challenge data CHA (Step S21).

When the verifier module Hx of the secret key encryption utilization algorithm Secret_ver. 1.3 is activated (Step S10), the verifier control unit 14 chooses "No" in Steps S16 and S32, before choosing "Yes" in Step S18. The verifier control unit 14 generates a 64-bit random number RND, and has the verifier module Hx of the secret key encryption utilization algorithm Secret_ver. 1.3 encrypt the random number RND using a secret verifier key K1. The encrypted data E(K1, RND) is then transmitted to the claimant 104 via the verifier AV interface 11 as the challenge data CHA (Step S20). The verifier control unit 14 is then set into a waiting state for receiving response data RES (Step S23).

After the claimant AV interface 31 receives the challenge data CHA, the claimant control unit 33 proceeds from Step S21 to Step S22. The claimant control unit 33 has the claimant module Hy of the secret key encryption utilization algorithm Secret_ver. 1.3 decrypt the challenge data CHA using a secret claimant key K1 to obtain the decrypted data D(K1, CHA), which is then transmitted to the verifier 101 via the claimant AV interface 31 as the response data RES (Step S22).

After the verifier AV interface 11 receives the response data RES from the claimant 104, the verifier control unit 14 proceeds from Step S23 to Step S24. The verifier control unit 14 has the verifier module Hx of the secret key encryption utilization algorithm Secret_ver. 1.3 compare the response data RES with the random number RND to judge whether the claimant 104 is an authentic device (Step S24).

In the present embodiment, when there are a plurality of executable versions of verifier modules for the verifier and a plurality of executable versions of claimant modules for the claimant, a verifier module and a claimant module to be used for authentication are determined in accordance with the verifier and claimant type information, so that the authentication can be performed properly. Since the system is designed so that there will always be at least one matching method out of the verifier methods provided in the verifier and the claimant methods provided in the claimant, authentication will definitely be possible for any combination of verifier and claimant.

The security priority table is provided to the verifier and the claimant, so that a most secure verifier/claimant module can always be selected from the plurality of versions of verifier modules and the plurality of versions of claimant modules.

In addition to the security priority table, the speed priority table is provided to the verifier and the claimant, so that a verifier/claimant module with the highest processing speed can always be selected from the plurality of versions of verifier modules and the plurality of versions of claimant modules.

In the present embodiment, both the verifier and the claimant have a verifier/claimant method table storage unit 13 which they use to select a verifier method and a claimant method respectively. However, the verifier/claimant method table storage unit may be only provided in either the verifier or the claimant, which may then be given the right to determine both the verifier method and the claimant method to be used for authentication (the right to determine a verifier/claimant method is the same as the right to determine an authentication protocol in challenge-response format).

In this case, a device which has the right to determine the verifier/claimant method refers to the combination of its own type information and notified type information of the other device to determine the verifier/claimant method. The verifier and the claimant then activate a verifier module and a claimant module corresponding to the determined verifier/claimant method respectively, and execute authentication processing.

In the present embodiment, a connector or a communication cable specified for connecting AV devices has been used as an example of the communication link, although any communication link which connects AV devices, such as a computer bus, can be used.

Also, while authentication protocols in challenge-response format have been used in the present embodiment, other authentication protocols which are not in challenge-response format may be used. Such authentication protocols include one-way authentication protocols in time sequence. In the protocols, a verifier and a claimant are each provided with a counter register whose initial value is set at "1". On receiving a request signal from the verifier, the claimant encrypts the initial value "1" using a secret claimant key K1 and transmits the encryption result E(K1, 1) to the verifier.

On receiving the encryption result E(K1, 1), the verifier decrypts it using a secret verifier key K1, and compares the decrypted value with the initial value "1" on its counter register. When two values coincide, the verifier increments the counter register to "2", and notifies the claimant of authentication completion.

On being notified of the authentication completion, the claimant also increments its counter register to "2". With both counter registers of the verifier and the claimant being "2", the above processing is repeated.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication system where a plurality of information devices, that are capable of executing a plurality of encryption utilization protocols, communicate with each other, wherein each information device comprises:

notification means for transmitting type information showing a device type of a present information device, that represents at least one encryption utilization protocol that can be executed by the present information device out of the plurality of encryption utilization protocols, to another information device in the communication system with which communication is to be performed;

determining means for determining which encryption utilization protocol is to be used in the communication, from a combination of the type information of the present information device and type information received from the other information device with which the communication is to be performed; and communication means, equipped with at least one protocol correspondence communication unit that performs communication using a corresponding encryption utilization protocol out of the plurality of encryption utilization protocols that are represented by the device type shown by the type information of the present information device, for having one of the protocol correspondence communication units perform the communication with the other information device using the encryption utilization protocol determined by the determining means, wherein there are n different device types, n being at least two, wherein the determining means of each information device includes:

a table storage unit for storing at least one table where each combination of two device types selected from the n different device types is associated with protocol correspondence information that shows which of the plurality of encryption utilization protocols should be used for the combination;

a type information storage unit for storing the type information showing the device type of the present information device out of the n different device types;

a determination unit for determining, on being informed of the type information of the other information device with which the communication is to be performed, an encryption utilization protocol shown by protocol correspondence information that is associated in the table stored in the table storage unit to the combination of the type information of the other information device and the type information of the present information device as the encryption utilization protocol which is to be used in the communication; and wherein the communication means has a protocol correspondence communication unit that corresponds to the encryption utilization protocol determined by the determination unit to perform the communication using the determined encryption utilization protocol.

2. The communication system of claim 1, wherein the plurality of encryption utilization protocols are a plurality of authentication protocols, wherein each protocol correspondence communication unit in one of the plurality of information devices in the communication system includes:

an authentication unit for having another information device in the communication system with which communication is to be performed make an attempt to prove that the other information device is authentic using an authentication protocol determined by the determination unit, and for judging from the attempt whether the other information device is authentic; and a transmission unit for transmitting data that is subject to protection to the other information device only when the authentication unit has judged that the other information device is authentic.

3. The communication system of claim 2, wherein the table storage unit in each information device stores a plurality of different tables in which each combination of two device types selected from the n different device types is associated with protocol correspondence information that shows which of the plurality of authentication protocols should be used for the combination, wherein a first table out of the plurality of different tables stores protocol correspondence information that shows a most secure authentication protocol that should be used for each combination of two device types selected from the n different device types, wherein a second table out of the plurality of different tables stores protocol correspondence information that shows an authentication protocol with a highest processing speed that should be used for each combination of two device types selected from the n different device types, wherein the determining means in the information device further includes a selection unit for selecting one out of the plurality of different tables stored in the table storage unit with consideration to which of high security and fast processing is desired for the communication to be performed and for informing the other information device of the selected table, and wherein the determination unit in each information device determines the authentication protocol to be used in the communication from the table selected by the selection unit, out of the plurality of different tables stored in the table storage unit.

4. The communication system of claim 3, wherein the plurality of authentication protocols include a plurality of authentication protocols in challenge-response format,
  wherein the plurality of authentication protocols in challenge-response format include authentication protocols in challenge-response format that use public key encryption and authentication protocols in challenge-response format that use secret key encryption,
  wherein the protocol correspondence information in the first table shows the authentication protocols in challenge-response format that use the public key encryption as most secure authentication protocols in challenge-response format,
  wherein the protocol correspondence information in the second table shows the authentication protocols in challenge-response format that use the secret key encryption as authentication protocols in challenge-response format with the highest processing speed, and
  wherein the communication means in each information device is equipped with protocol correspondence communication units which perform communication based on the authentication protocols in challenge-response format that use the public key encryption and protocol correspondence communication units which perform communication based on the authentication protocols in challenge-response format that use the secret key encryption.

5. The communication system of claim 4,
  wherein an authentication unit in each protocol correspondence communication unit which performs communication based on an authentication protocol in challenge-response format that uses public key encryption in the information device comprises:
  a first challenge data generation unit for generating a random number and transmitting the random number to the other information device as challenge data;
  a first decryption unit for decrypting, on receiving response data from the other information device, the response data using predetermined public key data; and
  a first judgement unit for judging whether the other information device is authentic based on a decryption result obtained by the decryption unit,
  and wherein an authentication unit in each protocol correspondence communication unit which performs communication based on an authentication protocol in challenge-response format that uses secret key encryption in the information device comprises:
  a second challenge data generation unit for generating a random number and transmitting the random number to the other information device as challenge data;
  a second decryption unit for decrypting, on receiving response data from the other information device, the response data using predetermined secret key data; and
  a second judgement unit for judging whether the other information device is authentic based on a decryption result obtained by the decryption unit.

6. The communication system of claim 2,
  wherein the plurality of authentication protocols include a plurality of authentication protocols in challenge-response format,
  wherein the plurality of authentication protocols in challenge-response format include authentication protocols in challenge-response format that use public key encryption and authentication protocols in challenge-response format that use secret key encryption.

7. The communication system of claim 2,
  wherein the plurality of authentication protocols include one-way authentication protocols in time sequence.

8. In a communication system where a plurality of information devices are capable of receiving data by executing at least one protocol out of a plurality of encryption utilization protocols between information devices in order to communicate with each other, the improvement of at least one information device comprising:
  a notification unit for transmitting type information showing a device type of the information device, that represents at least one encryption utilization protocol that can be executed by the present information device out of the plurality of encryption utilization protocols, to another information device in the communication system with which communication is to be performed;
  a determining unit for determining which encryption utilization protocol is to be used in the communication, from a combination of the type information of the present information device and type information received from the other information device with which the communication is to be performed, including
    a table storage unit for storing at least one table where each combination of at least two device types is associated with protocol correspondence information that shows which of the plurality of encryption utilization protocols can be used for communication,
    a type information storage unit for storing the type information showing the device type of the present information device out of the plurality of information device types, and
    a determination unit for determining, on being informed of the type information of the other information device with which the communication is to be performed, an encryption utilization protocol shown by protocol correspondence information that is associated in the table stored in the table storage unit to the combination of the type information of the other information device and the type information of the present information device as the encryption utilization protocol which is to be used in the communication; and
  a communication unit, equipped with at least one protocol correspondence communication unit that performs communication using a corresponding encryption utilization protocol out of the encryption utilization protocols that are represented by the device type shown by the type information of the present information device, for communicating with the other information device using the encryption utilization protocol determined by the determining unit.

9. The information device of claim 8 wherein the plurality of encryption utilization protocols are a plurality of authentication protocols, and the protocol correspondence communication unit includes:
  an authentication unit for having another information device in the communication system with which communication is to be performed make an attempt to prove that the other information device is authentic using an authentication protocol determined by the determination unit, and for judging from the attempt whether the other information device is authentic; and
  a transmission unit for transmitting data, that is subject to protection, to the other information device only when the authentication unit has judged that the other information device is authentic.

10. The information device of claim 9, wherein the table storage unit stores a plurality of different tables in which each combination of two device types selected from the different device types is associated with protocol correspondence information that shows which of the plurality of authentication protocols should be used for the combination;

wherein a first table, out of the plurality of different tables, stores protocol correspondence information that shows a most secure authentication protocol that should be used for each combination of two device types selected from the different device types;

wherein a second table, out of a plurality of different tables, stores protocol correspondence information that shows an authentication protocol with a highest processing speed that should be used for each combination of two device types selected from the different device types;

wherein the determining unit in the information device further includes a selection unit for selecting one out of the plurality of different tables stored in the table storage unit with consideration to which of high security and fast processing is desired for the communication to be performed and for informing the other information device of the selected table; and wherein the determination unit determines the authentication protocol to be used in the communication from the table selected by the selection unit, out of the plurality of different tables stored in the table storage unit.

11. The information device of claim 10, wherein the plurality of authentication protocols include a plurality of authentication protocols in challenge-response format;

wherein the plurality of authentication protocols in challenge-response format include authentication protocols in challenge-response format that use public key encryption and authentication protocols in challenge-response format that use secret key encryption;

wherein the protocol correspondence information in the first table shows the authentication protocols in challenge-response format that use the public key encryption as most secure authentication protocols in challenge-response format;

wherein the protocol correspondence information in the second table shows the authentication protocols in challenge-response format that use the secret key encryption as authentication protocols in challenge-response format with the highest processing speed; and wherein the communication unit is equipped with a first protocol correspondence communication unit which performs communication based on the authentication protocols in challenge-response format that use the public key encryption and a second protocol correspondence communication unit which performs communication based on the authentication protocols in challenge-response format that use the secret key encryption.

12. The information device of claim 11, wherein the authentication unit in the first protocol correspondence communication unit performs communication based on an authentication protocol in a challenge-response format that uses public key encryption in the information device comprises:

a first challenge data generation unit for generating a random number and transmitting the random number to another information device as challenge data;

a first encryption unit for decrypting, on receiving response data from the other information device, the response data using predetermined public key data;

a first judgement unit for judging whether the other information device is authentic based on a decryption result obtained by the decryption unit; and wherein the authentication unit in the second protocol correspondence communication unit performs communication based on an authentication protocol in challenge-response format that uses secret key encryption in the information device comprises:

a second challenge data generation unit for generating a random number and transmitting the random number to the other information device as challenge data;

a second decryption unit for decrypting, on receiving response data from the other information device, the response data using predetermined secret key data; and a second judgement unit for judging whether the other information device is authentic based on a decryption result obtained by the decryption unit.

13. The information device of claim 9, wherein the plurality of authentication protocols include a plurality of authentication protocols in challenge-response format; and wherein the plurality of authentication protocols in challenge-response format include authentication protocols in challenge-response format that use public key encryption and authentication protocols in challenge-response format that use secret key encryption.

14. The information device of claim 9, wherein the plurality of authentication protocols include one-way authentication protocols in time sequence.

* * * * *